(12) United States Patent  (10) Patent No.: US 6,560,805 B2
Dallas et al.  (45) Date of Patent: May 13, 2003

(54) SPADE

(75) Inventors: Edgar A. Dallas, Beaverton, OR (US); Michael Brock, Madison, WI (US)

(73) Assignee: Alterra Holdings Corporation, Tigard, OR (US)

( * ) Notice: Subject to any disclaimer, the term of this patent is extended or adjusted under 35 U.S.C. 154(b) by 0 days.

(21) Appl. No.: 09/877,715

(22) Filed: Jun. 8, 2001

(65) Prior Publication Data

US 2002/0184713 A1 Dec. 12, 2002

(51) Int. Cl.[7] ............................................... A01D 11/00
(52) U.S. Cl. .................................. 7/116; 7/148; 7/158
(58) Field of Search ............................. 7/114, 116, 118, 7/148, 158; 294/51, 53.5, 57

(56) References Cited

U.S. PATENT DOCUMENTS

| 2,576,869 A | * | 11/1951 | Woltemath | 7/148 |
| 3,993,340 A | * | 11/1976 | Rusing et al. | 294/53.5 |
| 4,023,221 A | * | 5/1977 | Cadman | 7/114 |
| 4,475,757 A |   | 10/1984 | Glock |  |
| 4,700,420 A | * | 10/1987 | Belanger | 7/114 |
| 5,063,628 A | * | 11/1991 | Campbell | 294/51 |
| 5,105,493 A | * | 4/1992 | Lugtenaar | 7/158 |
| 5,297,306 A | * | 3/1994 | Shandel | 7/114 |
| D414,670 S |   | 10/1999 | Linden |  |
| 6,182,541 B1 | * | 2/2001 | Anderson et al. | 7/118 |
| 6,279,186 B1 | * | 8/2001 | Ge et al. | 7/118 |

FOREIGN PATENT DOCUMENTS

SE 58 231 3/1913
SE 181 280 12/1935

OTHER PUBLICATIONS

Partial International Search Report for PCT/US02/16665, mailed Oct. 4, 2002.

* cited by examiner

Primary Examiner—James G. Smith
(74) Attorney, Agent, or Firm—Foley & Lardner

(57) ABSTRACT

A spade includes a shank, a handle coupled to the shank, and a blade coupled to the shank. A cutting tool such as a saw is coupled to the handle, which has an internal channel sized to receive the cutting tool.

12 Claims, 6 Drawing Sheets

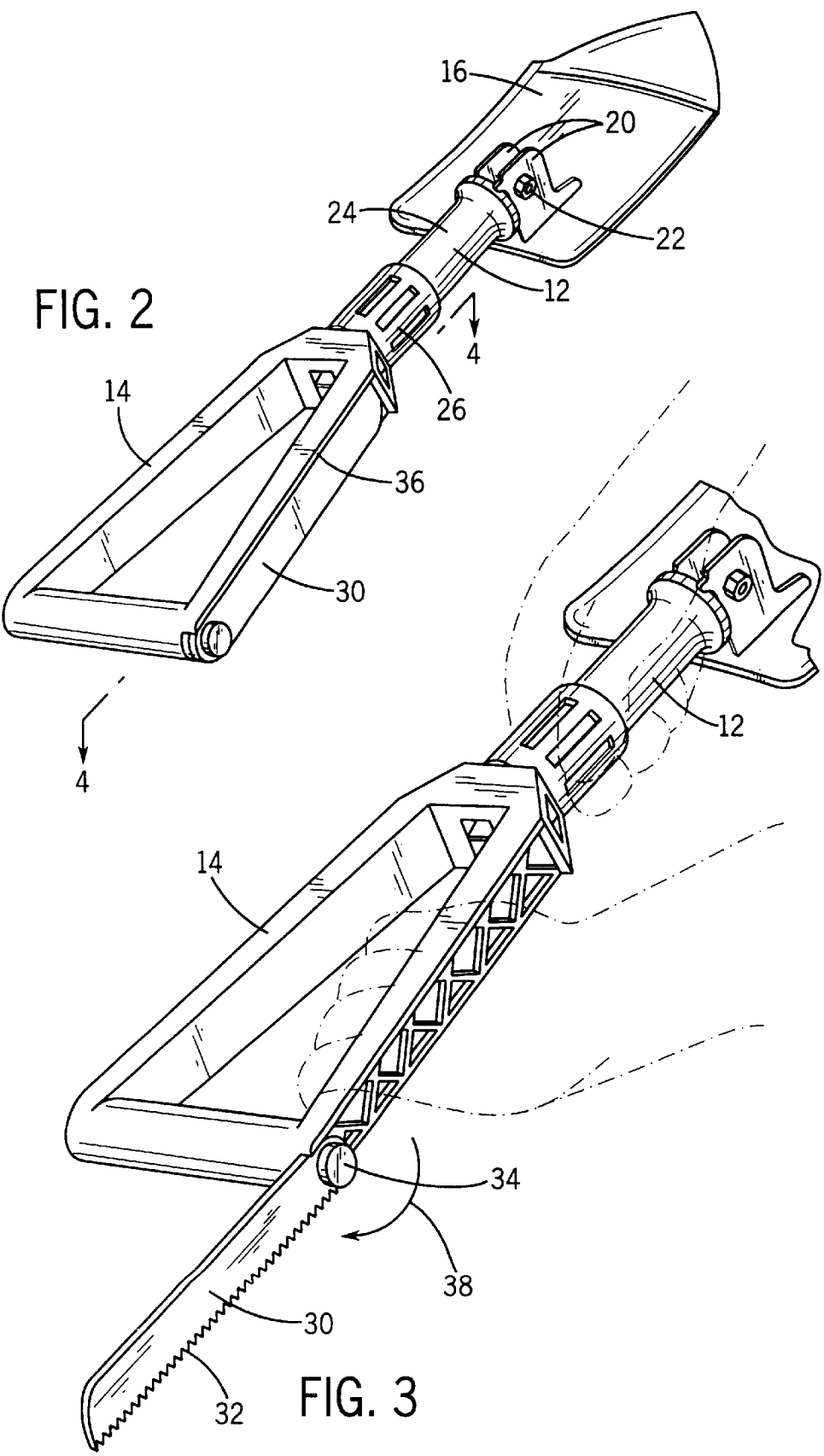

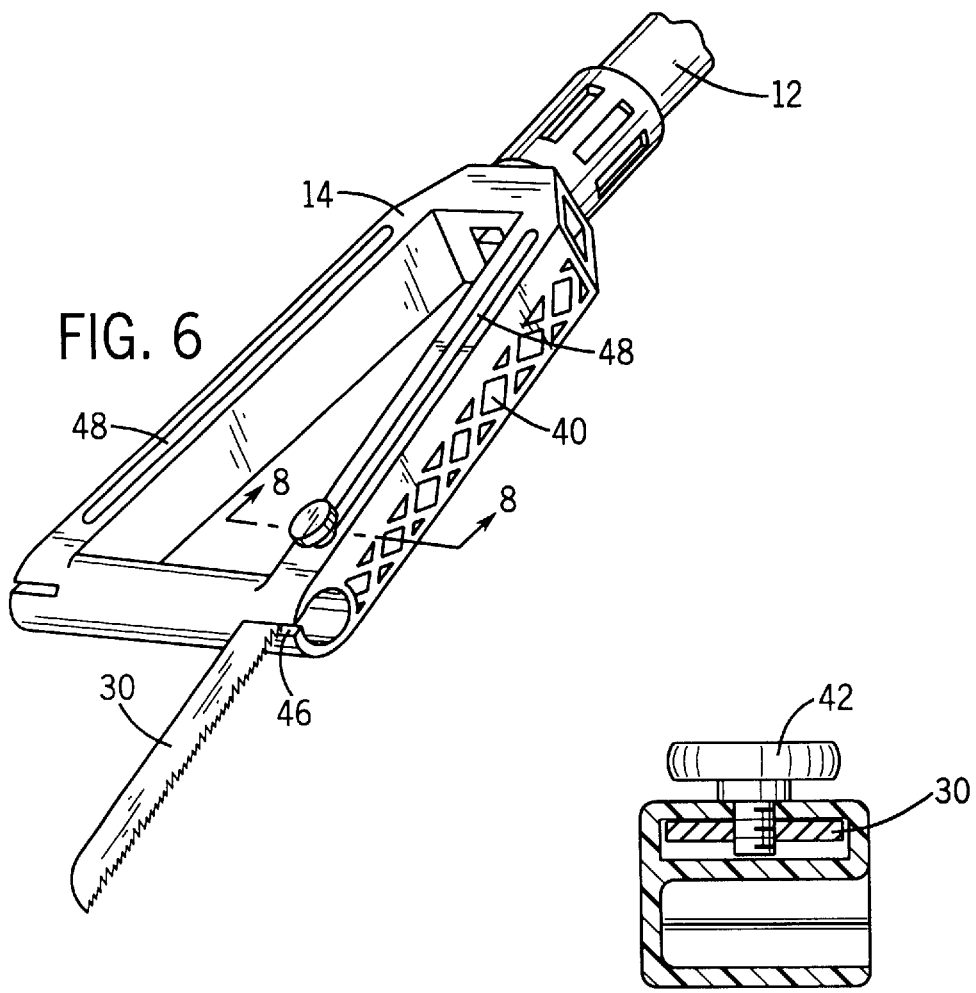
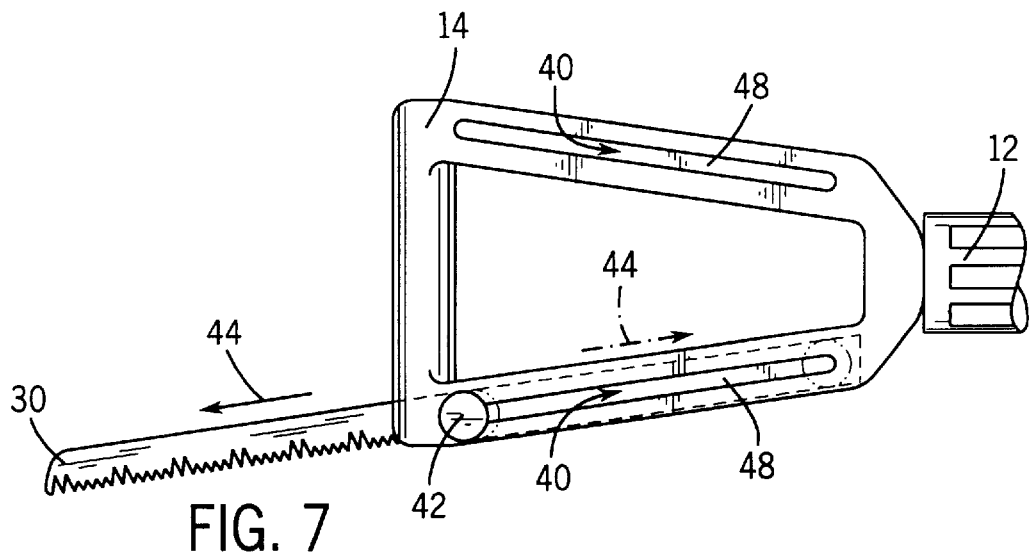

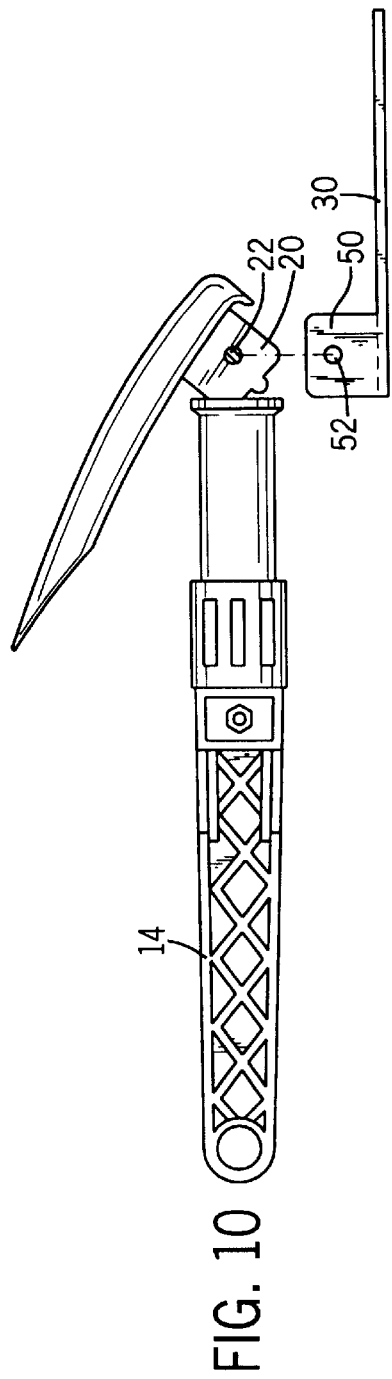
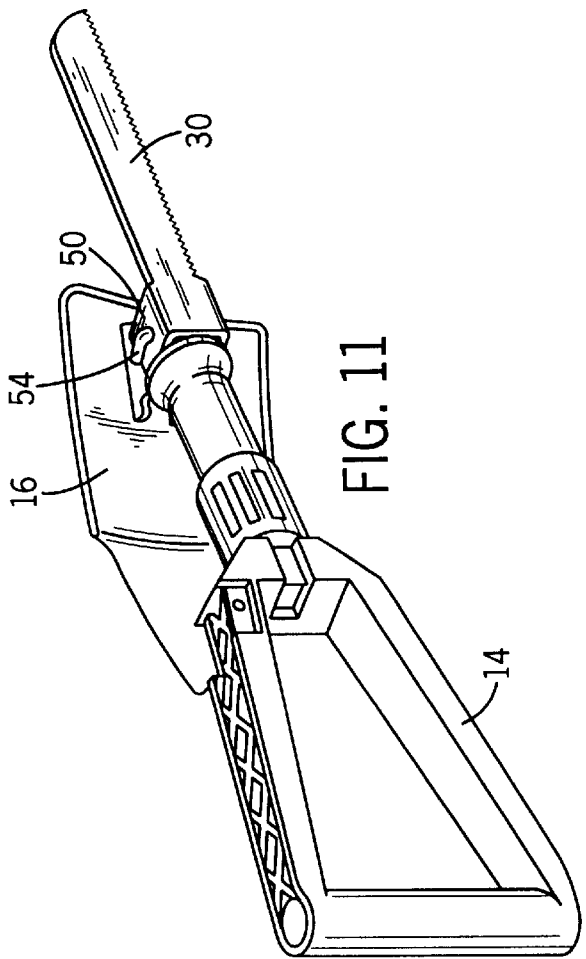
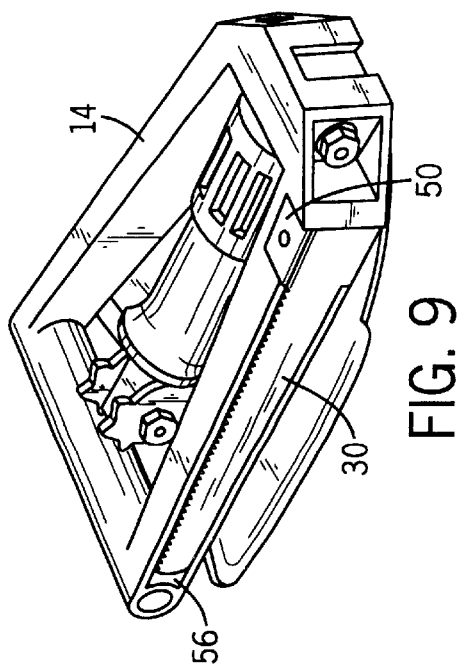
FIG. 10
FIG. 11
FIG. 9

SPADE

FIELD OF THE INVENTION

The present specification relates to a spade. More specifically, the present specification relates to a collapsible spade having an attached cutting tool such as a knife or saw.

BACKGROUND OF THE INVENTION

Spades, such as collapsible spades and entrenching tools, are used for various purposes. For example, military personnel may use an entrenching tool to dig fortifications. Civilians find uses for collapsible spades when engaging in camping or other outdoor activities.

Entrenching tools are typically collapsible to save space when the tool is transported. The tool is made collapsible by having a blade or shovel and handle pivotally coupled to a shank.

Entrenching tools can, in addition to the shovel portion, have other ancillary tools such as an axe or a hammer. Further, a saw can be incorporated into the entrenching tool by providing a serrated or saw tooth cutting edge on the side of the blade for purposes of sawing, cutting into fencing, chopping through tree roots, etc.

Conventional entrenching tools and collapsible spades that incorporate a saw or knife edge into the spade blade have a variety of disadvantages. First, having an exposed cutting edge on the blade is a safety hazard as the user can be injured while using the tool for digging purposes, or while folding, storing, or transporting the tool. Second, a cutting edge provided in the blade can become dull after repeated use, requiring replacement of the entire blade portion of the tool in order to provide a new cutting edge. Third, when the cutting edge is provided directly on a portion of the spade, it is difficult to carry a replacement blade as an entire new blade portion may have to be carried along with the spade as a replacement part.

To remedy the disadvantages of conventional spades and entrenching tools, it is known to carry a separate saw along with the entrenching tool. However, carrying a separate saw adds bulk and weight to the overall carrying load of the user, and further creates the risk that the user will lose the saw because it is being carried separately, resulting in the inability to cut or saw when necessary.

Accordingly, there is a need for a spade that does not have a saw or knife edge incorporated into the blade portion of the tool. Further, there is a need for a spade or entrenching tool that safely incorporates a saw into the tool such that the user can easily carry a replacement saw blade, and eliminating the necessity of carrying an entire separate saw along with the entrenching tool.

The teachings hereinbelow extend to those embodiments that fall within the scope of the appended claims, regardless of whether they accomplish one or more of the above identified needs.

SUMMARY OF THE INVENTION

An exemplary embodiment relates to a spade. The spade includes a shank, a handle coupled to the shank, a blade coupled to the shank, and a cutting tool slidably coupled to the handle. The handle has an internal channel sized to receive the cutting tool.

Another exemplary embodiment relates to a spade. The spade includes a shank, a handle coupled to the shank, a blade coupled to the shank, and a cutting tool pivotally coupled to the handle. The cutting tool has a storage position and an operational position and the handle has a channel sized to receive the cutting tool.

Further, an exemplary embodiment relates to a spade. The spade includes a shank having a first end and a second end, a handle coupled to the shank at the first end, and a blade coupled to the shank at the second end. A cutting tool having a storage position and an operational position is coupled to the handle in the storage position and is coupled to the second end of the shank in the operational position.

Further still, an exemplary embodiment relates to a spade having a shank, a handle coupled to the shank, and a blade coupled to the shank. A cutting tool is coupled to the handle and the handle has a pocket configured to house the cutting tool in a storage position. An attachment mechanism couples the cutting tool to the blade when the cutting tool is in an operational position.

BRIEF DESCRIPTION OF THE DRAWINGS

The invention will become more fully understood from the following detailed description, taken in conjunction with the accompanying drawings, wherein like reference numerals refer to like elements, in which:

FIG. 2 is a perspective view of a spade;

FIG. 3 is a perspective view of a spade having a saw in an operational position;

FIG. 6 is a fragmentary perspective view of a spade handle having a sliding saw in the operational position;

FIG. 7 is a fragmentary side view of the spade handle of FIG. 6 having the saw in the operational position;

FIG. 8 is a sectional view taken generally along line 8—8 of FIG. 6;

FIG. 9 is a perspective view of a folded spade having a detachable saw;

FIG. 10 is an exploded side view of the spade having a detachable saw of FIG. 9;

FIG. 11 is a perspective view of the spade of FIG. 10 having the detachable saw affixed in the operational position;

DETAILED DESCRIPTION OF THE DRAWINGS

Figure 1:
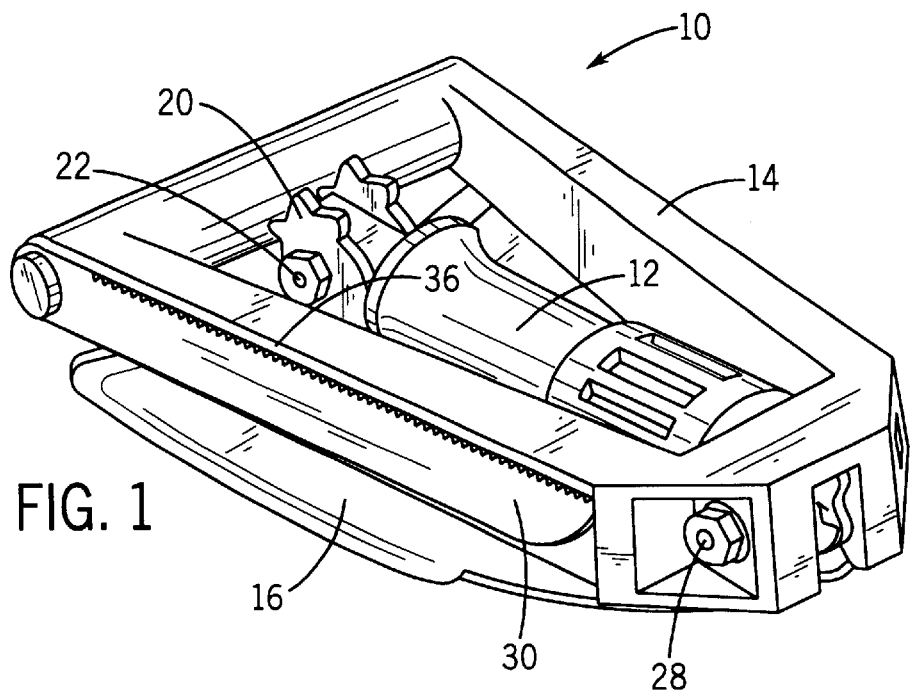
FIG. 1 is a perspective view of a spade in the folded position having a saw.

Referring to FIGS. 1 and 2, a spade or entrenching tool, shown as, but not limited to, collapsible spade 10 includes a shank 12 coupled to a handle 14 and a blade 16. The blade 16 may be any type of conventional digging implement. The shank 12, handle 14, and blade 16 may be pivotally connected such that the collapsible spade 10 may be folded into a compact configuration as depicted in FIG. 1.

Referring to FIG. 2, the blade 16 may be pivotally attached to the shank 12 at a first joint 22 via a pair of attachment lugs 20, although other types of connections would work as well. The blade 16 is preferably constructed of metal to serve as an effective digging tool.

Further referring to FIG. 2, the shank 12 includes a tube 24 and may include a locking device 26 used to lock the collapsible spade 10 into its operational configuration as depicted in FIG. 2. The tube 24 and locking device 26 may be made of either plastic or metal depending on the intended use of the collapsible spade 10.

Referring to FIG. 1, the handle 14 may be pivotally connected to the shank 12 at a second joint 28. The handle 14 is likely made of plastic and in an exemplary embodiment is made of a black glass filled nylon material.

The collapsible spade 10 includes a cutting tool, shown as, but not limited to, saw 30 which can be attached to the handle 14. In a preferred embodiment, the saw 30 is a fast cut wood blade constructed of high carbon steel and includes a serrated edge 32. In a preferred embodiment, the saw 30 is 0.06 inches thick. In other embodiments, the cutting tool may be a knife or other conventional cutting instrument.

Figure 4:
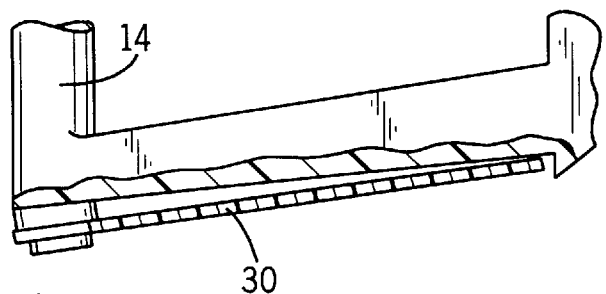
FIG. 4 is a fragmentary cut away view of the spade with saw of FIG. 2 along line 4—4.
Figure 5:
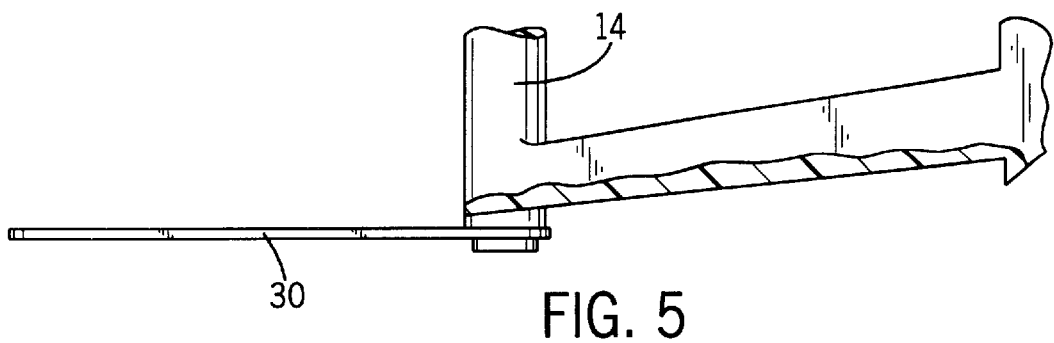
FIG. 5 is the view of FIG. 4 with the saw in the operational position.

In a first exemplary embodiment, saw 30 is pivotally coupled to handle 14 via a fastener 34 such that it includes a storage position depicted in FIG. 4 and an operational position depicted in FIGS. 3 and 5. In the present embodiment, saw 30 is moved into operational position by rotating saw 30 one hundred eighty degrees about fastener 34 in the direction of arrow 38 (see FIG. 3).

A lip 36 is disposed above serrated edge 32 when saw 30 is in the storage position to protect the user from injury while using collapsible spade 10 or while collapsible spade 10 is being transported in either the folded or operational positions.

Referring to FIG. 3, collapsible spade 10 may be used to saw or cut through objects when saw 30 is in the operational position. The user may grasp handle 14 and shank 12 to operate saw 30. In an exemplary embodiment, the saw 30 may be locked into the operational position by a locking mechanism.

Referring to FIGS. 6–8, in another exemplary embodiment of collapsible spade 10, saw 30 may be slidably attached to handle 14. To support this embodiment, handle 14 is provided with an internal channel 40 sized to fully receive saw 30 in a storage position. The channel 40 is fully enclosed to protect the user from serrated edge 32. A knob 42 is attached to saw 30 through a saw slot 48 disposed in handle 14. The saw slot 48 permits the user to use knob 42 to slide saw 30 in and out of internal channel 40 as depicted by arrows 44 in FIG. 7. An aperture 46 (see FIG. 6) disposed in handle 14 permits movement of saw 30 in and out of internal channel 40.

Referring to FIG. 7, the handle may include dual channels 40 and saw slots 48 to support the operative attachment of saw 30 to multiple locations on handle 14.

Referring to FIG. 8, knob 42 may be tightened to lock saw 30 in position relative to handle 14, such that the user may lock saw 30 into an operational position or into a storage position to avoid unintended sliding of saw 30 relative to handle 14.

Referring to FIGS. 9–11, yet another exemplary embodiment of collapsible spade 10 is depicted. In the present embodiment, saw 30 includes a pair of attachment flanges 50 configured to secure saw 30 to joint 22. Each attachment flange 50 includes an aperture 52 configured to receive a pin 54 (shown in FIG. 11) to couple saw 30 to joint 22. Other attachment means would be suitable as well. To use saw 30, blade 16 must be pivoted out of its operational position as depicted in FIG. 11 so as not to interfere with saw 30.

Referring to FIG. 9, saw 30 may be stored on handle 14 when not in use. A recess 56 within handle 14 encompasses saw 30 to provide for safe storage and transport of saw 30.

Figure 12:
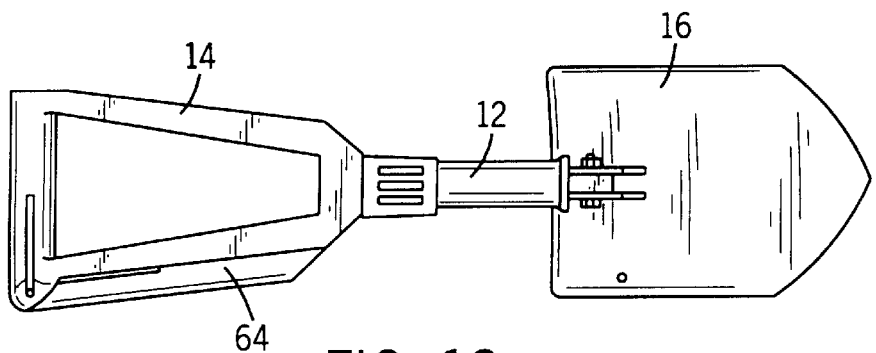
FIG. 12 is a side view of a spade.

Referring to FIGS. 12–16, a further exemplary embodiment of the present invention is shown. Referring to FIG. 12, a pocket 64 on handle 14 houses saw 30 in a storage position. The pocket 64 maintains saw 30 in a safe position while not in use.

Figure 13:
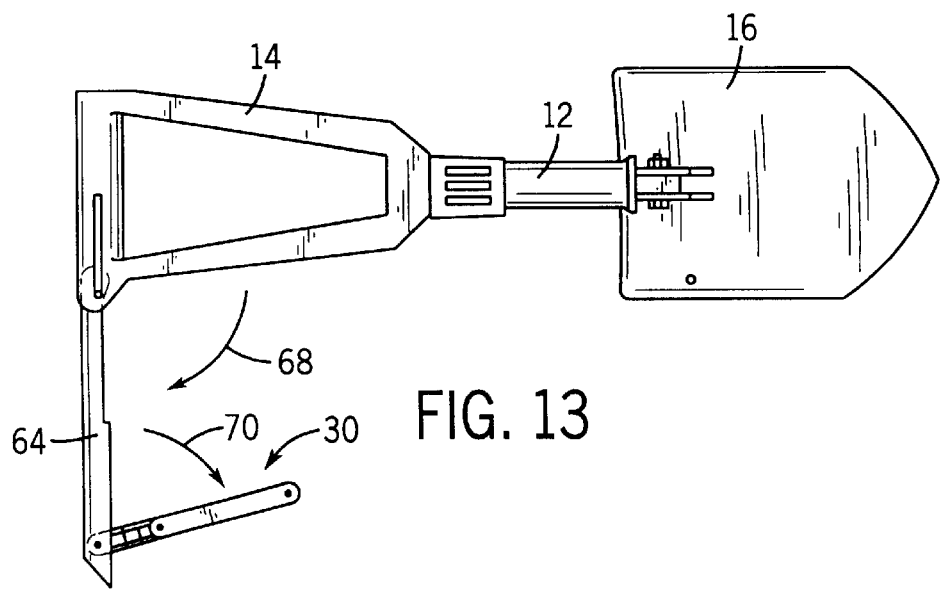
FIG. 13 is a side view of the spade of FIG. 12 with a saw in an intermediate position between the operational and storage position.

Referring to FIG. 13, pocket 64 pivots away from handle 14 in the direction of arrow 68. Saw 30 is pivotally attached to an end of pocket 64 and may be unfurled in the direction of arrow 70 away from pocket 64 once pocket 64 has been pivoted away from handle 14.

Figure 14:
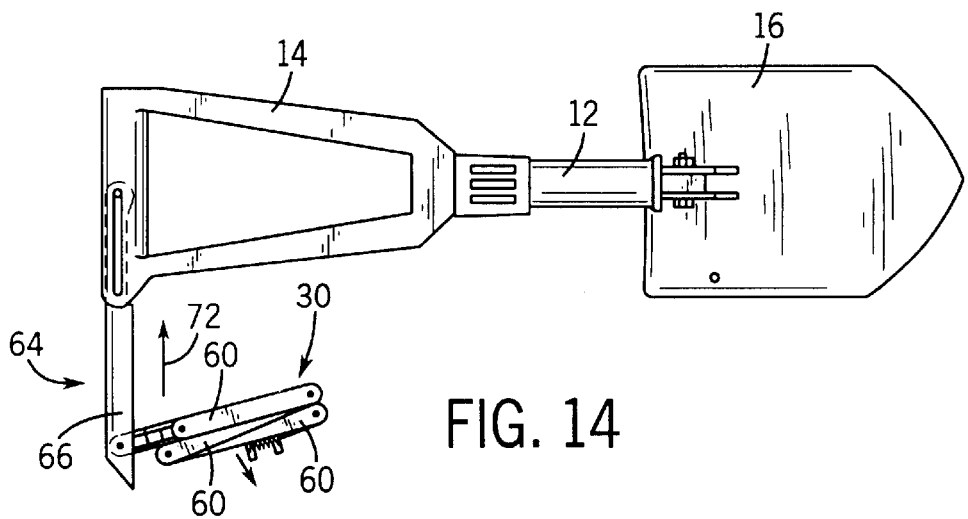
FIG. 14 is a side view of the spade of FIG. 12 with the saw in an intermediate position between the operational and storage positions.

Referring to FIG. 14, pocket 64 slides into handle 14 in the direction of arrow 72 via a conventional sliding mechanism housed within handle 14. After sliding pocket 64 into handle 14, pocket 64 is pivotally fixed with respect to handle 14 creating a fixed handle extension 66 used to support one end of saw 30.

Figure 15:
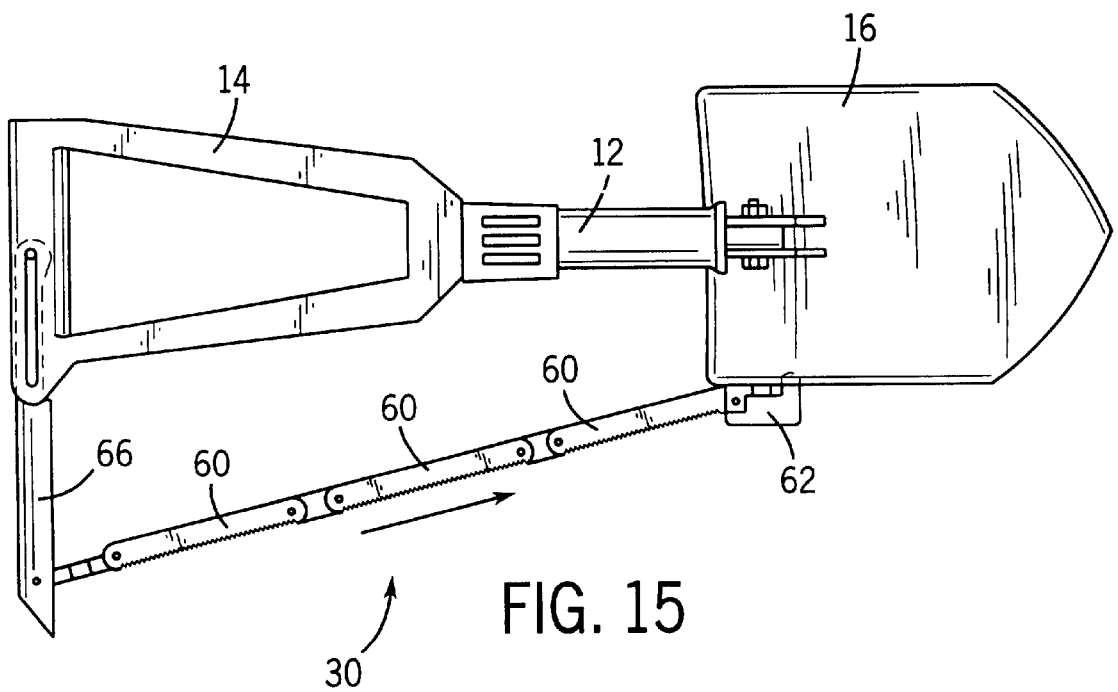
FIG. 15 is a side view of the spade of FIG. 12 with the saw in the operational position.

Referring to FIGS. 14 and 15, in the present embodiment, saw 30 includes a plurality of links 60 pivotally connected to one another permitting saw 30 to be extended from handle extension 66 to blade 16 as depicted in FIG. 15.

Figure 16:
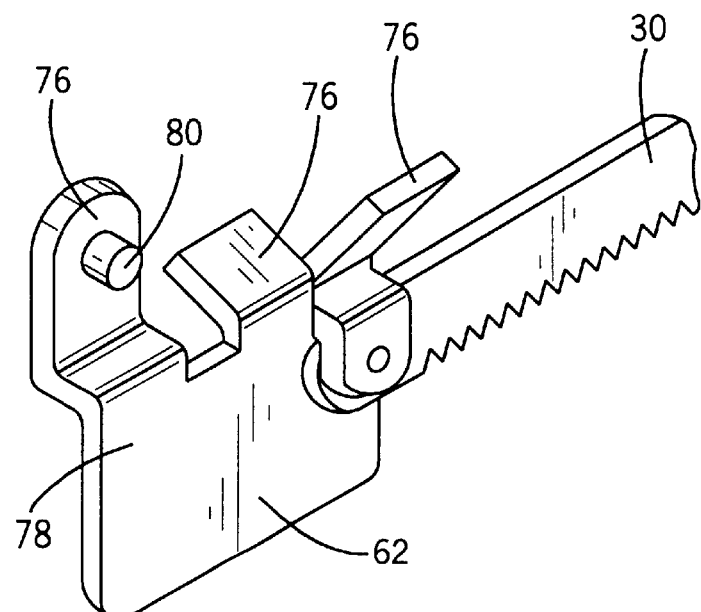
FIG. 16 is a perspective view of the attachment mechanism for the saw of FIG. 15.

Referring to FIGS. 15 and 16, saw 30 is attached to blade 16 via an attachment mechanism 62. Attachment mechanism 62 may be affixed to blade 16 in any of a variety of conventional manners. In the embodiment depicted in FIG. 16, attachment mechanism 62 includes a plurality of flanges 76 extending from a base plate 78 to grasp blade 16. A detent 80 may extend from one of the flanges 76 to further secure attachment mechanism 62 to blade 16.

In each of the exemplary embodiments described herein, the attachment device used to couple the saw 30 to the collapsible spade 10 may be a quick release device permitting quick detachment and attachment of saw 30 to spade 10.

The exemplary embodiments described herein solve the problems associated with conventional collapsible spades by providing saw 30 that is attached to collapsible spade 10 such that the saw 30 is not easily lost. Further, when not in use, the saw 30 is maintained in a safe storage position on the collapsible spade 10 such that the user is not injured while using the collapsible spade 10 for other purposes, or while transporting the collapsible spade 10. Further, because saw 30 is a separate device from collapsible spade 10 as opposed to a sharpened edge incorporated directly into blade 16, saw 30 can be more easily replaced if serrated edge 32 becomes dull. Further, because saw 30 is incorporated into collapsible spade 10 while in the storage position in a safe and non-obtrusive manner, users of collapsible spade 10 will not be inclined to remove saw 30 from collapsible spade 10 and carry a separate saw 30.

While the detailed drawings and specific examples describe exemplary embodiments, they serve the purpose of illustration only. The configurations shown and described may differ depending on the characteristics of the collapsible spade 10. The collapsible spade 10 and saw 30 shown and described are not limited to the precise details disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A spade, comprising:
   a shank having a first end and a second end;
   a handle coupled to the shank at the first end;
   a blade coupled to the shank at the second end; and
   a cutting tool having a storage position and an operational position;
   wherein the cutting tool is coupled to the handle in the storage position and the cutting tool is coupled to the second end of the shank along with the blade in the operational position.

2. The spade of claim 1, wherein the cutting tool is a knife.

3. The spade of claim 1, wherein the cutting tool is a saw.

4. A spade, comprising:
   a shank having a first end and a second end;
   a handle coupled to the shank at the first end;
   a blade coupled to the shank at the second end; and
   a cutting tool having a storage position and an operation position;
   wherein the cutting tool is coupled to the handle in the storage position and the cutting tool is coupled to the second end of the shank in the operational position, and wherein the handle and the blade are pivotally coupled to the shank such that the spade is collapsible.

5. A spade, comprising:
   a shank having a first end and a second end;
   a handle coupled to the shank at the first end;
   a blade coupled to the shank at the second end; and
   a cutting tool having a storage position and an operational position;
   wherein the cutting tool is coupled to the handle in the storage position and the cutting tool is coupled to the second end of the shank in the operational position by a pin.

6. A spade, comprising:
   a shank having a first end and a second end;
   a handle coupled to the shank at the first end;
   a blade coupled to the shank at the second end; and
   a cutting tool having a storage position and an operation position;
   wherein the cutting tool is coupled to the handle in the storage position and the cutting tool is coupled to the second end of the shank in the operational position, and wherein the handle includes a lip configured to shield the cutting tool when the cutting tool is in the storage position.

7. A spade, comprising:
   a shank;
   a handle coupled to the shank;
   a blade coupled to the shank;
   a cutting tool coupled to the handle, wherein the handle has a pocket configured to house the cutting tool in a storage position; and
   an attachment mechanism coupling the cutting tool to the blade when the cutting tool is in an operational position.

8. The spade of claim 7, wherein the handle and the blade are pivotally coupled to the shank such that the spade is collapsible.

9. The spade of claim 7, wherein the cutting tool is a knife.

10. The spade of claim 7, wherein the cutting tool is a saw.

11. The spade of claim 7, wherein the pocket is pivotally attached to the handle.

12. The spade of claim 7, wherein the cutting tool comprises at least two pivotally connected links.

* * * * *